H. D. MILLER.
DRAG.
APPLICATION FILED APR. 4, 1916.

1,197,528.

Patented Sept. 5, 1916.
2 SHEETS—SHEET 1.

Witnesses
J. L. Wright
Wm. Pagger

Inventor
Herman D. Miller
By Victor J. Evans,
Attorney

UNITED STATES PATENT OFFICE.

HERMAN D. MILLER, OF MILROY, INDIANA.

DRAG.

1,197,528.  Specification of Letters Patent.  Patented Sept. 5, 1916.

Application filed April 4, 1916. Serial No. 88,894.

*To all whom it may concern:*

Be it known that I, HERMAN D. MILLER, a citizen of the United States, residing at Milroy, in the county of Rush and State of Indiana, have invented new and useful Improvements in Drags, of which the following is a specification.

This invention relates to drags, and it has for its object to produce a simple and improved device of this class for the purpose of crushing, leveling and compacting the soil.

A further object of the invention is to produce a simple and effective drag whereby hillocks and high places will be leveled and the soil distributed in the low places at a single operation.

A further object of the invention is to produce a device of the class described which will be simple and inexpensive in construction and which may be operated with small expenditure of power.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however, understood that no limitation is necessarily made to the precise structural details therein exhibited, but that changes, alterations and modifications within the scope of the claim may be resorted to when desired.

Figure 1:
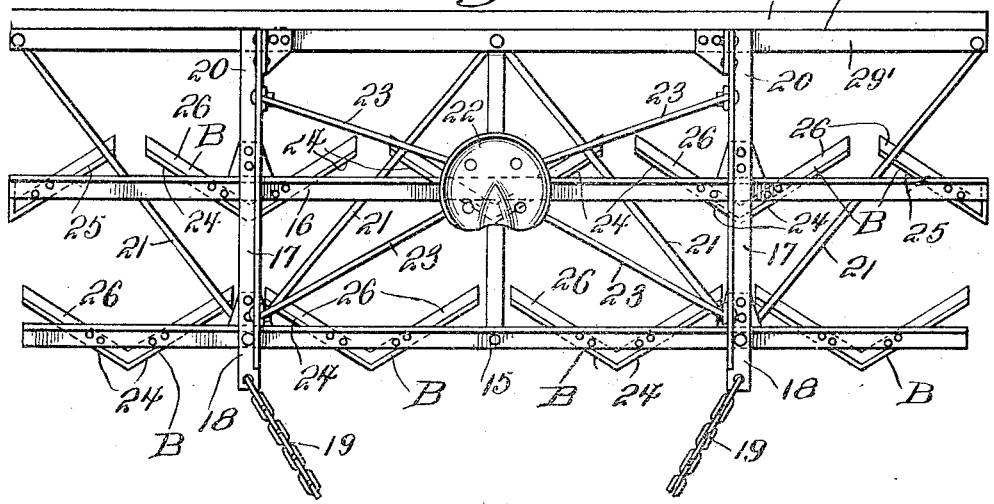
Figure 2:
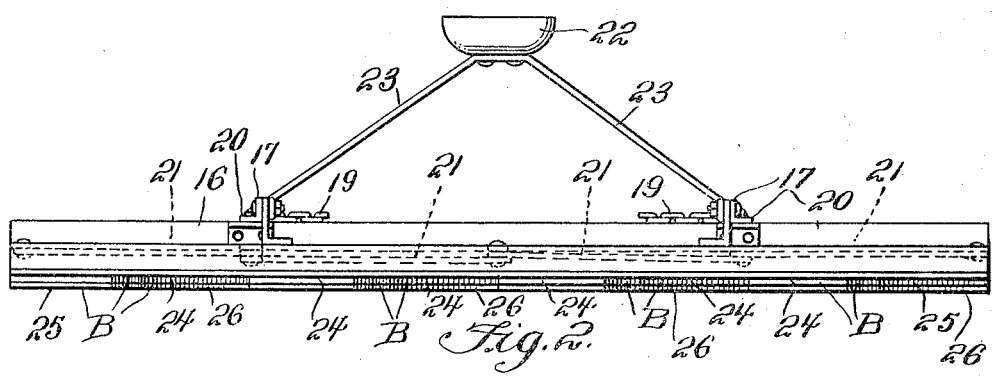
Figure 3:
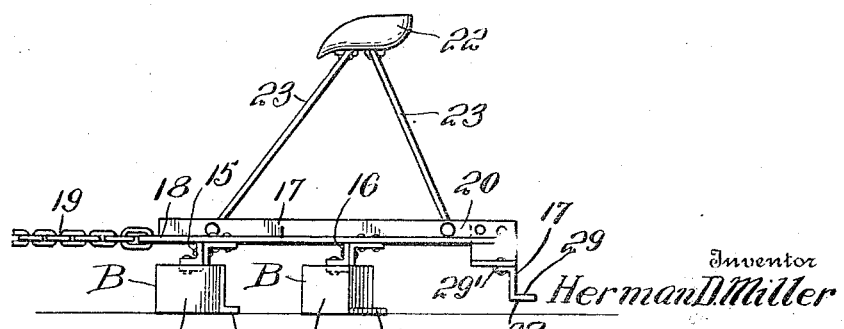
Figure 4:
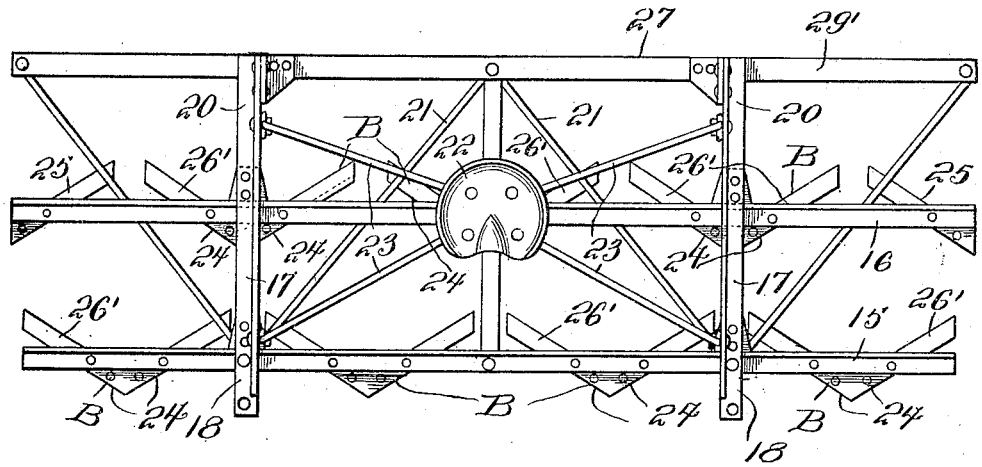
Figure 5:
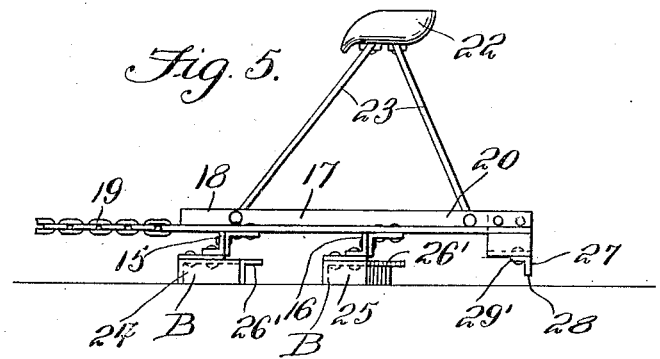
Figure 6:
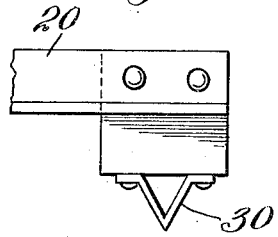

In the drawings,—Figure 1 is a top plan view of a drag constructed in accordance with the invention. Fig. 2 is an end view of the same. Fig. 3 is a rear elevation. Fig. 4 is a top plan view illustrating a modified form of the invention. Fig. 5 is an end view of the same. Fig. 6 is an end view illustrating a further modification.

Corresponding parts in the several figures are denoted by like characters of reference.

The frame of the improved drag is composed of front and rear bars 15 and 16, the same being connected together and spaced apart by means of cross bars 17. The cross bars 17 are extended forwardly of the front cross bars 15 to produce brackets 18 with which draft elements, such as chains 19, are connected, it being understood that either draft animals or a tractor may be used to supply the requisite power for pulling the drag over the field, and that the draft elements 19 may be connected in any well known manner with such motive power. The cross bars 17 are also extended rearwardly of the rear frame bar to produce brackets 20. Diagonal braces 21 may be used to reinforce the frame. A seat 22 for the driver or operator is supported by bars or supporting members 23 in such a manner as to distribute the weight of the operator equally over the area of the frame.

The individual earth engaging or displacing elements consist of scrapers B which are V-shaped as seen from the top, each scraper consisting of wings 24 disposed at an angle of approximately 120 degrees to each other with the apex to the front, each scraper being formed of a flat bar or plate of iron or steel by simply bending the same to the proper angle. The wings 24 in a full sized machine are preferably about 18 inches in length and of any desired width. The scrapers are secured in any convenient manner to the undersides of the front and rear bars 15, 16, being spaced apart about five or six inches, and the scrapers mounted on the rear bar 16 being arranged in alternate order with the scrapers on the front bar 15. It being evident that by this arrangement the front bar will carry one scraper in excess of the number carried by the rear bar, this defect is compensated for by mounting at the ends of the rear bar 16 two separate wings 25 which, being properly spaced from the proximate scrapers, will be so positioned as to slightly overlap or extend beyond the outer wings of the scrapers mounted on the ends of the front bar 15. When perfect symmetry is preserved, assuming the individual scrapers to be spaced six inches apart, the amount of overlap of the terminal wings 25 with respect to the end scrapers B on the front bar 15 will amount to three inches which will be found sufficient in ordinary circumstances to dispose of the dirt displaced by the said end scrapers of the front bar.

The individual scrapers may be provided with rearwardly extending flanges 26 at their lower edges, said flanges constituting shoes or trowels that will serve to assist in smoothing, crushing and pulverizing the soil. These flanges, however, may be entirely omitted or, as in Figs. 4 and 5, such flanges may be formed at the upper edges of the wings 24, as seen at 26′ in Figs. 4 and 5, in which event they will serve as stiffening and bracing purposes and also to facilitate the attachment of the scrapers to the frame of the drag.

Securely connected with the rearwardly extending bracket portions 20 of the cross bar 17 is a rear beam 27 the length of which is equal to that of the rear bar 16. The earth engaging edge 28 of the beam 27 is raised above the ground above the earth engaging edges of the wings of the scrapers B to the extent of about one and one-half inches in a full sized working machine, the purpose being to enable said bar to be utilized for crushing, leveling and compacting the dirt that is displaced by the scrapers without permitting such dirt to accumulate in front of the beam 28. The said beam may have a rearwardly extending flange 29 at its lower edge to exert a troweling action on the dirt. Such flange may, however, be dispensed with or a flange 29' may extend rearwardly from the upper edge of the beam to facilitate the attachment thereof to the frame brackets 20.

In lieu of the beams shown in Figs. 1 to 5, inclusive, a beam 30 of V-shaped cross section may be used, as seen in Fig. 6. A smoothing beam of this shape will be particularly strong and rigid and will also serve in an efficient manner to distribute the dirt and to smooth, crush and compact the same.

In drags as heretofore constructed, it frequently happens that dirt which is displaced laterally from the high places by scraper blades or wings disposed obliquely with respect to the line of progress is not properly distributed in the low places, but is permitted to form a ridge or streak for the distribution of which means are oftentimes not provided. By the present invention the wings of each scraper are disposed at an obtuse angle to each other, preferably of about 120 degrees, as shown, and dirt taken from the high places by the scrapers attached to the front bar of the frame will thus be displaced laterally for a considerable distance and will be subsequently operated upon by the scrapers attached to the rear frame bar, it being particularly noticed that the ridges left by the outer wings of the end scrapers connected with the front frame bar will be taken care of by the wings 25. The loose dirt taken from the high places of the ground will be distributed in advance of the rear beam carried by the bracket members 20, and owing to the fact that the ground engaging edge of said beam is disposed in a plane above that of the ground engaging edges of the scrapers, the loose dirt will be scattered and distributed evenly over the surface of the ground, being at the same time leveled, pulverized and compacted, thus leaving the soil in the best possible condition for further operations.

Having thus described the invention, what is claimed as new, is:—

In a drag, front and rear frame bars, cross bars connecting the same and extending forwardly and rearwardly thereof, V-shaped scrapers carried by the front and rear frame bars and arranged in alternate order on said bars, and a leveling beam carried by the rearwardly extending ends of the cross bars, the ground engaging edge of said leveling beam being disposed in a plane above that of the ground engaging edges of the scrapers; the rear frame bar being also equipped with individual obliquely disposed wings overlapping the outer wings of the end scrapers carried by the front frame bar.

In testimony whereof I affix my signature in presence of two witnesses.

HERMAN D. MILLER.

Witnesses:
ALONZO INNIS,
JOSEPH L. CONING.

Copies of this patent may be obtained for five cents each, by addressing the "Commissioner of Patents, Washington, D. C."